J. P. JUBB.
Coffee-Pot.
No. 218,981. Patented Aug. 26, 1879.
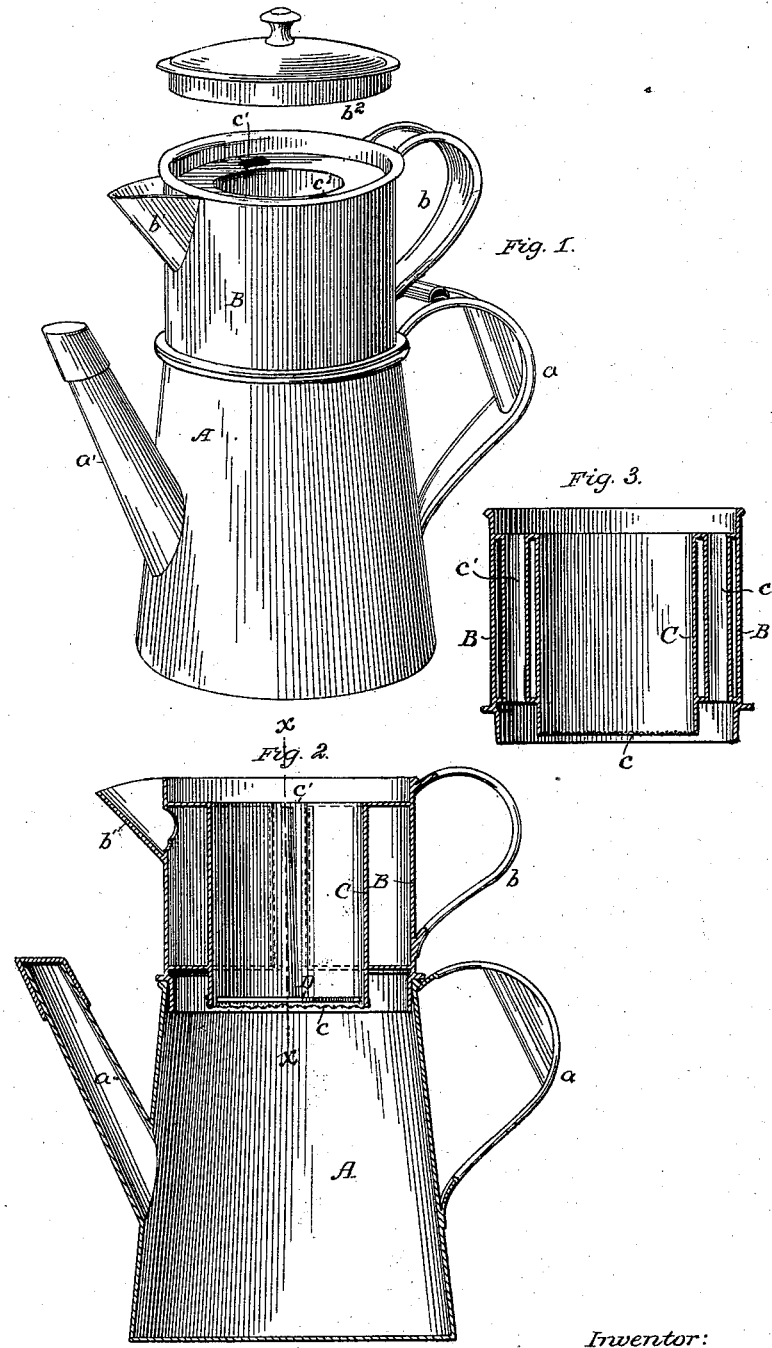

UNITED STATES PATENT OFFICE.

JOHN P. JUBB, OF FAYETTE, MICHIGAN.

IMPROVEMENT IN COFFEE-POTS.

Specification forming part of Letters Patent No. 218,981, dated August 26, 1879; application filed April 11, 1879.

*To all whom it may concern:*

Be it known that I, JOHN P. JUBB, of Fayette, Delta county, Michigan, have invented certain new and useful Improvements in Coffee-Pots; and I do hereby declare the following to be a full, clear, and exact description thereof, reference being had to the accompanying drawings, making a part of this specification, in which—

Figure 1 is a perspective view of a coffee-pot constructed according to my improvement. Fig. 2 is a vertical section. Fig. 3 is a vertical section through the receptacle B.

My invention relates to the class of coffee-boilers in which the ground berry is placed within a receptacle having a perforated bottom, so that the boiling water percolates through it, and, extracting the essence, drops down into the boiler, making drip-coffee.

It is a well-known fact that during the process of boiling, the steam, as it is generated, passes away and carries with it much of the strength of the berry as long as it is allowed to remain over the fire.

The object of my invention is to so construct a coffee-boiler that the steam, as it ascends, will be condensed and fall back upon the coffee and percolate through it; and it consists in the construction and arrangement of parts, hereinafter more fully described and claimed.

In order that those skilled in the art may make and use my invention, I will proceed to describe the exact manner in which I have carried it out.

In the drawings, A is an ordinary coffee-boiler, with suitable handle and spout, $a$ and $a'$, and provided with an upper receptacle, B, also provided with handle and spout, $b\ b^1$, and of the same circumference as the top of the boiler A, so that it fits snugly into the opening up to the shoulder, and can be removed at pleasure, in which case its cover $b^2$ will serve as well for a cover for the boiler A.

Within this cylinder or receptacle B is a smaller cylinder, C, having a wire-gauze bottom, $c$. Its height is somewhat less than that of the outer cylinder, (see Fig. 2,) and the space between the two is closed at top and bottom, as seen in cross-section in Fig. 2. By this arrangement the cylinder C is surrounded by a receptacle, which is to be filled with cold water, for a purpose hereinafter described.

A number of tubes, $c'$, open at both ends, pass up between the two cylinders, as shown by dotted lines in Fig. 2.

D is a lifter, to be placed in the bottom of cylinder C before the coffee is introduced, and which is to be drawn out, bringing all the ground grains with it.

When coffee is to be made, the water alone is put into the boiler A. The cylinder B is placed upon its top, the ground coffee-berry being placed within the perforated bottomed receptacle C, and cold water is introduced between the inner and outer cylinder by means of the spout.

The steam, as it is generated in boiler A, will ascend through the tubes $c'$, which, being surrounded by cold water, will cause the steam to condense, and portions of it will fall into the cylinder C, and percolate through the coffee and extract the essence, which will drop into the boiler below.

It is evident that should it be desired to place the coffee upon the table in the same vessel in which it is made, one need only lift the portion B from the boiler and put on the lid $b^2$.

By the use of my improvement the beverage is greatly improved, and it does not lose its strength when allowed to stand.

Having thus described my invention, what I claim as new, and desire to secure by Letters Patent, is—

The pot A, in combination with a coffee-receptacle, C, placed within and concentric with a condenser-chamber, which is provided with tubes $c'$, substantially as described, and for the purpose set forth.

JOHN PALMER JUBB.

Attest:
J. D. BUDD,
W. L. MAYNARD.